United States Patent
Beyers et al.

(10) Patent No.: US 6,388,700 B1
(45) Date of Patent: *May 14, 2002

(54) VIDEO PROCESSING APPARATUS AND METHOD

(75) Inventors: Billy Wesley Beyers, Carmel; Aaron H. Dinwiddie, Fishers, both of IN (US)

(73) Assignee: Thomson Licensing S.A., Boulogne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,160

(22) Filed: Jul. 19, 1999

(51) Int. Cl.$^7$ ................................................ H04N 7/16
(52) U.S. Cl. .................... 348/5.5; 348/465; 348/468; 348/478; 348/565
(58) Field of Search ..................... 348/5.5, 465, 468, 348/478, 565, 456, 466, 564, 553, 563; H04N 7/16

(56) References Cited

U.S. PATENT DOCUMENTS

| | | | | |
|---|---|---|---|---|
| 5,512,954 A | | 4/1996 | Shintani .................... 348/468 |
| 5,602,598 A | | 2/1997 | Shintani .................... 348/565 |
| 5,671,019 A | | 9/1997 | Isoe et al. .................... 348/565 |
| 5,715,014 A | * | 2/1998 | Perkins et al. ............... 348/563 |
| 5,790,204 A | | 8/1998 | Yamaguchi .................. 348/564 |
| 5,929,927 A | * | 7/1999 | Rumreich et al. ........... 348/563 |
| 5,929,929 A | * | 7/1999 | Yang ........................... 348/565 |
| 5,959,687 A | * | 9/1999 | Dinwiddie et al. ......... 348/564 |
| 6,055,023 A | * | 4/2000 | Rumreich et al. .......... 348/553 |

\* cited by examiner

*Primary Examiner*—Andrew I. Faile
*Assistant Examiner*—Hai V. Tran
(74) *Attorney, Agent, or Firm*—Joseph S. Tripoli; Robert D. Shedd

(57) ABSTRACT

A television set having the option of displaying main and one or more auxiliary pictures, ratings control capability which includes means for an authorized person to limit the display of programs having ratings beyond a selected level, closed captioning capability which includes means for a viewer to choose to display closed captioning along with a picture, and a single stripper for slicing data from the vertical blanking information (VBI) portion of one or more broadcasts wherein the single stripper processes ratings control information for both main picture and auxiliary picture when the ratings control option has been invoked by cycling between main and auxiliary; and the auxiliary picture capability is disabled when the closed captioning option has been invoked.

14 Claims, 2 Drawing Sheets

VIDEO PROCESSING APPARATUS AND METHOD

FIELD OF THE INVENTION

The present invention relates to video signal processing systems that have optional "V-Chip" ratings control (RC), optional auxiliary information display such as closed captioning (CC) display, and the option of simultaneously displaying a main picture (or image) and one or more auxiliary pictures (or images).

BACKGROUND

Video signal processing apparatus which process and produce a signal suitable for coupling to a display device for producing a display having, at the option of the viewer, main and auxiliary images, i.e., multi-image display, are well known. As used herein, the term "video signal processing apparatus" or "video signal processing system" is intended to encompass various types of video signal processing devices including, but not limited to, television signal processing devices that may or may not include a display device. Examples of such devices include television sets, television receivers, direct broadcast satellite (DBS) signal receivers, and video cassette recorders (VCR). A displayed image produced in response to activating a multi-image option includes the auxiliary image either within, outside or beside the main image. For example, certain television receivers include a picture-in-picture ("pix-in-pix" or "PiP") feature that, when activated, produces an image signal representing both a main image region and a smaller auxiliary image region within the main image region.

With regard to closed captioning and ratings control, all television receivers larger than 13" in size, which includes virtually all multi-image display-capable receivers sold in the U.S., are required to include both CC decoding capability and V-Chip RC capability. As described in more detail below, CC and RC capability are provided by decoding auxiliary information included in a television signal. For example, auxiliary information may be included in the vertical blanking interval (VBI) of an analog television signal such as an NTSC signal. In a digital television signal, such as an HDTV signal which includes packets of digital data, auxiliary information may be included in certain packets of digital data, e.g., packets having a particular packet identifier. The auxiliary information included in a television signal comprises various types of data including CC data and Extended Data Services (XDS) data. XDS data provides various types of information such as program rating information. The ratings information included in XDS data can be decoded and used to provide V-Chip RC capability. Both CC and XDS data are described in detail in standard EIA-608 from the Electronics Industries Association.

Other systems for providing auxiliary information, such as captioning and rating information, are known. For example, teletext systems in use in Europe provide such information.

In the U.S. V-Chip rating control system, V-Chip ratings control (RC) can be activated or deactivated by a viewer who has the proper authorization (hereinafter referred to as "parent"). When activated by the parent, the processor within the receiver utilizes a "stripper" which functions to slice, or extract, auxiliary information, and process ratings information contained in the television signal. When the ratings information exceeds the value elected by the authorized viewer, the processor is designed to blank the screen and mute the audio portion of the broadcast. For television receivers which also have multi-image display capability, the receiver must provide RC if both main and auxiliary pictures are displayed and the parent has activated RC. A television receiver that provides RC permits a user to prevent certain programs and/or scenes from being viewed and heard based on the content of the program/scenes. For example, a user might specify that programs and/or scenes including violent subject matter should be excluded. Alternatively, a user can specify a rating limit, such as PG-13, and programs and scenes exceeding that limit (e.g., R and X rated programs) could not be viewed or heard. By decoding program content information included in data such as XDS data, a television receiver containing the stripper can slice information from the VBI to determine the content and rating of television programs and scenes and can compare the content and rating to the limits set by a user. For those programs and scenes that exceed the specified limits, the video display is modified, e.g., blanked, and the audio is muted. In addition, the receiver may display a message indicating the reason for the interrupted reception and the expected duration of the interruption (e.g., SCENE EXCEEDS CONTENT LIMIT). The parent may also deactivate the V-chip ratings control by choosing to permit any level of broadcast to be displayed; in such case no stripping by a data slicer takes place.

CC data are also included in the VBI of standard television broadcasts, and are necessary for use by hearing impaired persons. For most viewers, CC is not needed and so television receivers provide means to toggle the CC display function on or off. A NTSC (National Television Standards Committee) television signal will include two bytes of closed captioning data during the latter half of each occurrence of line 21 of field 1. CC data may be decoded and displayed to provide a visible text representation of a television program's audio content. Additional CC data and other types of auxiliary information, such as extended data services information (XDS), may be included in other line intervals such as line 21 of field 2.

In the case when the CC display option has been enabled and the parent has elected to activate the RC option, a single data slicer may be used for both functions by designing it to rapidly cycle back and forth between stripping CC and RC data; in such case it is usually necessary to design the cycles to be every two seconds, approximately, with appropriate timeouts if no data is received, in order to have effective CC processing and RC. In such situations, a problem has arisen for situations where the viewer also wishes to display both main and auxiliary images such as when a PiP or PoP feature is activated.

Prior to this invention, the conventional view has been that a second data slicer, which is a relatively expensive hardware item, would be needed to effectively handle both RC and CC functions for multiple broadcasts when V-Chip was legally mandated since CC data is received continuously and a single slicer could not be switched away to receive RC data, or else characters would be dropped from the CC.

SUMMARY OF THE INVENTION

In one aspect the invention comprises a method for operating a video signal processing system for producing an output signal suitable for coupling to a display device for producing a displayed image, and having the option of producing the output signal to represent a main picture and one or more auxiliary pictures (AP), ratings control (RC) capability which includes means for an authorized person to limit the display of programs having ratings beyond a selected level, and auxiliary information (AI) processing capability which includes means for a viewer to choose to display auxiliary information comprising closed captioning along with a picture, and a single stripper for extracting auxiliary data from a portion of one or more video signals comprising using the single stripper to process RC information for both the main picture and the auxiliary picture when the RC option has been invoked by cycling between main and auxiliary; and disabling the AP capability when the auxiliary information display option has been enabled.

In another aspect the invention comprises a video signal processing system for producing an output signal suitable for coupling to a display device for producing a displayed image having capability of receiving main and auxiliary video signals and, at the option of the viewer, displaying the signals simultaneously; a decoder for extracting and decoding coded ratings control data and closed captioning data multiplexed into the video signals; and one or more processors for: activating or deactivating closed captioning processing at the option of the viewer; activating and setting a level of ratings control processing at the option of an authorized person; rapidly cycling the decoder between extracting ratings control data and closed captioning data, when both are activated, for a single video signal; or to rapidly cycle the decoder between extracting ratings control for main and auxiliary video signals when simultaneous display is activated; and to automatically disable simultaneous displaying and thereupon display only main video signal when closed captioning is activated.

In another aspect, the invention comprises apparatus for processing and displaying a main television signal and optionally displaying a second television signal comprising a display device; a control device for optionally processing ratings control information contained in each displayed video signal and for optionally processing auxiliary information comprising captioning within a displayed television signal; a single device to strip ratings control information when ratings control option is invoked and to strip auxiliary information when auxiliary information is invoked; a processor to rapidly cycle the single device between stripping ratings control information between each of the main and auxiliary signals when ratings control option is invoked, and to disable the auxiliary signal option when auxiliary information display option is invoked.

DETAILED DESCRIPTION

The invention will be illustrated with respect to a preferred embodiment of the invention, but the invention should not be construed as limited in any way thereto. For example, a television receiver will be illustrated, but the invention is also applicable to other types of video processing systems with display devices such as television sets, DBS signal receivers, and VCRs. Closed captioning will be illustrated, but the invention also applies to other XDS data. PiP is illustrated, but the invention also applies to PoP, and picture beside picture.

1. Receiver Having AP

Figure 1:
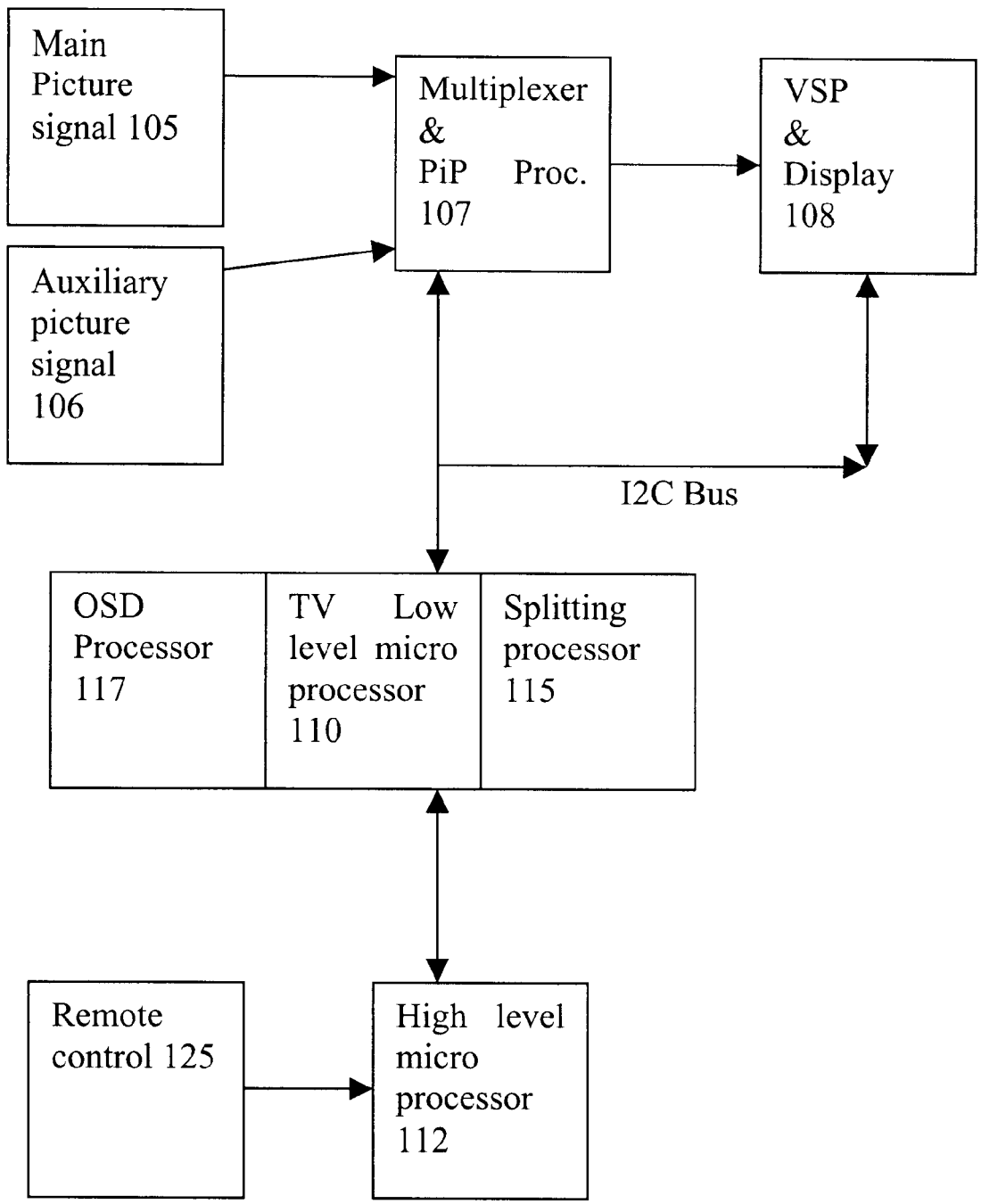
FIG. 1 shows, in block diagram form, an exemplary video signal processing system.

A television receiver having a display 108 which is driven by a signal received from multiplexer 107 is illustrated in FIG. 1. The multiplexer receives a main picture signal 105 from a tuner, which in turn receives the signal from a source such as an antenna or cable system, and an auxiliary picture signal 106 either from a second tuner, a VCR tuner, or another source. The multiplexer is controlled by TV low level microprocessor 10 which includes on screen display (OSD) processor 117 and a splitting processor 115. The tuners 105 and multiplexer operate in a conventional manner for tuning and demodulating a particular television signal.

2. Microprocessors for PiP, CC, and RC

The system shown in FIG. 1 also includes a main, TV low level, microprocessor ($\mu$P) 110 for controlling components of the television receiver such as tuner 105, picture-in-picture (PiP) processing unit (not shown), OSD processor 117, and splitting processor 115 module. As used herein, the term "microprocessor" represents various devices including, but not limited to, microprocessors, microcomputers, microcontrollers and controllers. Microprocessor 110 controls the system by sending and receiving both commands and data via a communications link such as a serial data bus, e.g., the $I^2C$ BUS which utilizes the well-known $I^2C$ serial data bus protocol. More specifically, high level processing unit (microprocessor) 112 executes control programs contained within memory in response to commands provided by a user, e.g., via IR remote control 125 and IR receiver located on the television set. Splitting processor 115 functions under the control of high level microprocessor 112 to strip information from the main and any auxiliary picture signals and use the stripped information to provide closed captioning and any other auxiliary data to the display, and to exert ratings control for each of the main and any auxiliary pictures.

3. Activation of CC, RC, and/or AP via Remote Control

Figure 2:
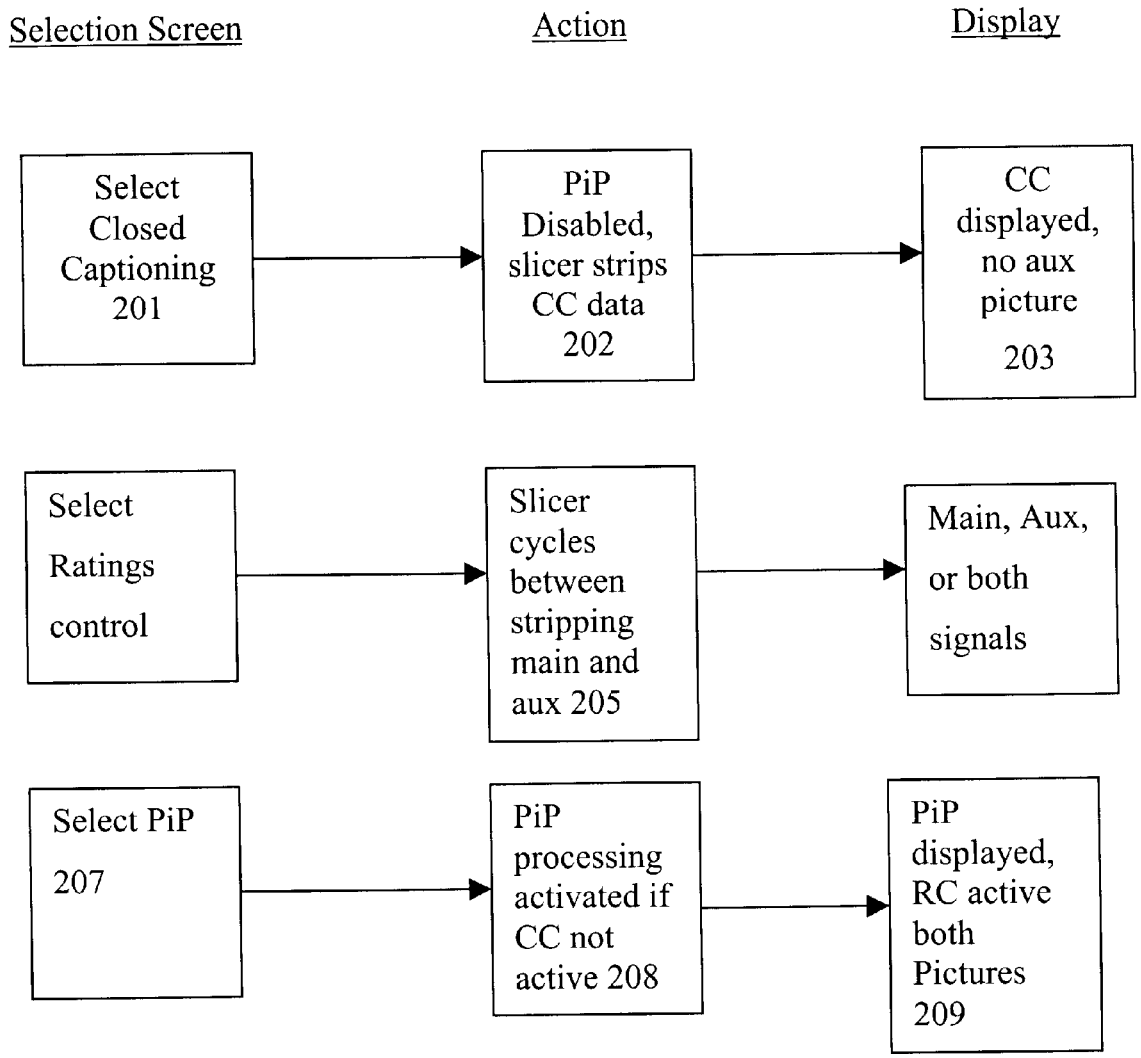
FIG. 2 shows in block diagram form, an embodiment of a portion of the system shown in FIG. 1 incorporating principles of the invention.

The high level processor 112 receives IR or any other form of signal from the remote controller and processes the received information as shown in FIG. 2. For example, selection of the closed captioning (CC) option on remote control 125 or in response to on screen prompts using the remote controller, causes the processor 112 to toggle the CC function and, in accordance with this invention, to deactivate the PiP function. Activation or deactivation of V-chip data processing, i.e., ratings control (RC) from remote control 125 may require entry of a code, hopefully known only to an authorized person such an adult. When RC is enabled, e.g., by the authorized user selecting a particular rating limit via remote control 125, microprocessor 112 configures splitting processor 115 for extracting RC data for each of main and any auxiliary pictures and audio portions. If PiP is selected and CC is deselected, then the splitting processor 115 is cycled every 2 seconds between main and auxiliary pictures. Other frequencies of cycling, of course, could be used, but in any case, a timeout period would be designed into the microprocessor logic so that if no ratings information is received for main or auxiliary picture sources, then the splitter cycles back. Microprocessor 112 continually monitors the received main and PiP signals and V-chip data to determine the content (e.g., rating, program title, program category, etc.) of television programming included in the television signal. As a specific example, microprocessor 112 monitors the received V-chip data and compares received programming information to a user-selected rating limit. If the rating of a particular program or scene is unacceptable, microprocessor 112 sends a control signal via $I^2C$ BUS to the PIP unit which modifies the displayed image to indicate on the display that the program is blocked.

4. When Activated, RC Function Applies to Both Main and PiP

V-chip related modification of the image may include blanking the image until the received rating data indicates that the received program (or scene) has an acceptable rating. In addition to blanking the image, microprocessor 112 may cause OSD processor 117 to generate signals OSD_RGB representing a text message that will be displayed on the blanked screen indicating, for example, the reason for and expected duration of the image modification. Blanking the image as referred to herein in regard to V-chip related modification of the image may involve replacing the normal video program display with a screen of a particular color, such as a blue screen, with or without a displayed message, or displaying a predetermined fixed image such as a particular scene or icon, or displaying a predetermined sequence of images stored in memory. As an alternative to blanking the image, microprocessor 112 could cause tuner 105 to select a different channel, for example, if the V-chip violation is expected to be of long duration (program related rather than scene related). Any or all of the described options could be user selected via on-screen set-up menus.

5. Splitting Processor Strips RC and CC Data from VBI

Microprocessor 112 controls functions included within μP 110 via a bus. In particular, microprocessor 112 controls primary splitting processor 115 and on-screen display (OSD) processor 117. Splitting processor 115 extracts auxiliary data such as CC data, and XDS data, which includes V-chip RC data, from a television signal. OSD processor 117 operates in a conventional manner to produce R, G, and B video signals OSD_RGB that, when coupled to display device 108, will produce a displayed image representing on-screen display information such as graphics and/or text. OSD processor 117 also produces control signal OSD_FSW which is intended to control a fast switch for inserting signals OSD_RGB into the system's video output signal at times when an on-screen display is to be displayed. For example, when a user enables closed captioning, e.g., by activating a particular switch on remote control 125 or responding to on screen prompts 201, microprocessor 112 enables processors 115 and 117 so that processor 115 extracts the CC data from line 21 intervals of video signal PIPV. Processor 117 produces signals OSD_RGB representing the CC data. Processor 117 also produces signal OSD_FSW indicating when the caption is to be displayed.

6. High Level Processor 112 Disables PiP When CC Option is Activated

Processor 110 also includes a fast switch for coupling signals produced by OSD processor 117 to the output video signal path at times when graphics and/or text is to be included in the displayed image. The fast switch is controlled by control signal OSD_FSW which is generated by OSD processor 117 in main microprocessor 110 at times when text and/or graphics are to be displayed.

When PIP processing is activated, the processors implement the PIP function in a conventional manner.

An exemplary embodiment of microprocessor 112 is a model ARM 7 with customized logic as described herein. An exemplary low level microprocessor 110 is a model M37270. An exemplary processor for providing the described PiP functionality of unit 107 of FIG. 1 is the M65616 picture-in-picture processor produced by Mitsubishi. An exemplary video signal processor (VSP) for providing video signal processing functions included in unit 108 of FIG. 1 is the LA7612 video signal processor produced by Sanyo.

When blanking of the main picture is required, for example, when main-picture rating information (V-chip data) processed by main μP 110 in FIG. 1 indicates that the current video program represented by the main picture component of signal PIPV in FIG. 1 exceeds the current rating limit. If so, main μP 110 sends a signal MAIN_BLANKING to unit 108 in FIG. 1 via the I²C bus and a blanking control unit included in unit 108 responds by modifying the main picture Y and C signals such that the main picture region of the displayed image is modified. Possible forms of modification include blanking or displaying a predetermined image such as an icon that would indicate to a user the reason for the blanking.

While this invention has been described and exemplified in detail, various modifications and alternatives should become apparent to those skilled in this art without departing from the spirit and scope of the invention.

What is claimed is:

1. A method of operating a video signal processing system for producing an output signal suitable for coupling to a display device for producing a displayed image, and having the option of producing the output signal to represent a main picture and one or more auxiliary pictures (AP), ratings control (RC) capability which includes means for an authorized person to limit the display of programs having ratings beyond a selected level, and auxiliary information (AI) processing capability which includes means for a viewer to choose to display auxiliary information comprising closed captioning along with a picture, and a single stripper for extracting auxiliary data from a portion of one or more video signals comprising:

using said single stripper to process RC information for both the main picture and the auxiliary picture when the RC option has been invoked by cycling between main and auxiliary; and disabling the AP capability when the auxiliary information display option has been enabled.

2. Method of claim 1 wherein said single stripper is used to slice RC and AI data from the vertical blanking interval of a television broadcast.

3. Method of claim 1 wherein AP capability is restored when the AI option is deselected.

4. An apparatus comprising a video signal processing system for producing an output signal suitable for coupling to a display device for producing a displayed image having auxiliary picture (AP), ratings control (RC), and auxiliary information comprising closed captioning display (AI) capabilities, a single stripper adapted to process RC information for both main picture and auxiliary picture when RC is invoked, and means to disable auxiliary picture capability when an AI option has been invoked.

5. Apparatus of claim 4 wherein said stripper is adapted to cycle between slicing RC and AI data from the vertical blanking interval (VBI) of a single television broadcast signal, or to cycle between RC data for main and RC data for AP when AI option has not been enabled by a viewer.

6. Apparatus of claim 4 wherein said stripper is a caption decoder which is capable of decoding and utilizing XDS data.

7. Apparatus of claim 6 wherein said caption decoder provides V-chip capability so as to permit a user from preventing programs and/or scenes which exceed a selected rating limit from being viewed or heard.

8. Apparatus of claim 7 wherein said processor receives RC data from said caption decoder and compares it to the ratings limit selected by a user for each of the main picture and, if selected, the AP.

9. Apparatus comprising a video signal processing system for producing an output signal suitable for coupling to a display device for producing a displayed image having capability of receiving main and auxiliary video signals and, at the option of the viewer, displaying said signals simultaneously;

a decoder for extracting and decoding coded ratings control data and auxiliary information data comprising closed captioning multiplexed into said video signals;

means for activating or deactivating auxiliary information processing;

means for activating and setting a level of ratings control processing;

means to rapidly cycle said decoder between extracting ratings control data and auxiliary information data, when both are activated, for a single video signal; or to rapidly cycle said decoder between extracting ratings control for main and auxiliary video signals when simultaneous display is activated;

and means to automatically disable simultaneous display and thereupon display only main video signal when auxiliary information display is activated.

10. Apparatus of claim 9 wherein said capability of receiving main and auxiliary video signals includes a picture-in-picture processor (PiP) and/or a picture-outside-picture (PoP) processor.

11. Apparatus of claim 9 wherein said decoder reads and extracts said rating information from each of two selected channels sequentially at a speed sufficient to disable viewing of either or both of two video signals selected for viewing, depending on whether the rating information is within a preselected rating limit.

12. Apparatus for processing and displaying a main television signal and optionally displaying a second television signal comprising a display device;

a control device for optionally processing ratings control information contained in each displayed video signal and for optionally processing auxiliary information comprising captioning within a displayed television signal;

a single device to strip ratings control information when ratings control option is invoked and to strip auxiliary information when auxiliary information is invoked;

a processor to rapidly cycle said single device between stripping ratings control information between each of said main and auxiliary signals when ratings control is invoked, and to disable the auxiliary signal option when auxiliary information display option is invoked.

13. Apparatus according to claim 12 wherein said single device strips ratings control data from the vertical blanking interval of each of the main and auxiliary television broadcasts when the ratings control option is invoked by an authorized person.

14. Apparatus according to claim 12 wherein said single device strips both ratings control data and closed captioning data from the vertical blanking interval of the main television broadcast when both ratings control and closed captioning options are selected.

* * * * *